United States Patent
Motozawa

(10) Patent No.: US 8,523,097 B2
(45) Date of Patent: Sep. 3, 2013

(54) VEHICULAR SEAT BELT

(75) Inventor: Yasuki Motozawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 12/937,394

(22) PCT Filed: Apr. 3, 2009

(86) PCT No.: PCT/JP2009/056967
§ 371 (c)(1),
(2), (4) Date: Oct. 12, 2010

(87) PCT Pub. No.: WO2009/128353
PCT Pub. Date: Oct. 22, 2009

(65) Prior Publication Data
US 2011/0031800 A1 Feb. 10, 2011

(30) Foreign Application Priority Data
Apr. 18, 2008 (JP) .................. 2008-109012

(51) Int. Cl.
*B60R 22/46* (2006.01)
(52) U.S. Cl.
USPC ........................................ 242/374
(58) Field of Classification Search
USPC .............. 242/374, 390.5, 390.6; 280/806, 280/807; 297/474–480; 244/122 B
See application file for complete search history.

(56) References Cited

U.S. PATENT DOCUMENTS

| | | | | |
|---|---|---|---|---|
| 2,610,810 | A | * | 9/1952 | Pelouch ............... 242/390.6 |
| 2,845,233 | A | * | 7/1958 | Pfankuch et al. ......... 242/382.6 |
| 4,508,288 | A | * | 4/1985 | Nilsson ................ 242/374 |
| 5,050,814 | A | * | 9/1991 | Butenop et al. .......... 242/374 |
| 6,419,176 | B1 | * | 7/2002 | Mizuno ................ 242/374 |
| 6,427,935 | B1 | * | 8/2002 | Fujii et al. ............. 242/390.9 |
| 6,863,308 | B2 | | 3/2005 | Motozawa |
| 2005/0178870 | A1 | * | 8/2005 | Loffler et al. ............ 242/374 |

FOREIGN PATENT DOCUMENTS

| | | |
|---|---|---|
| JP | 57-072663 A | 5/1982 |
| JP | 11-063189 A | 3/1999 |
| JP | 2001-151077 A | 6/2001 |
| JP | 2003-025955 A | 1/2003 |

* cited by examiner

*Primary Examiner* — Sang Kim
*Assistant Examiner* — Scott Haugland
(74) *Attorney, Agent, or Firm* — Carrier Blackman & Associates, P.C.; Joseph P. Carrier; William D. Blackman

(57) ABSTRACT

A vehicular seat belt device including: a belt reel on which a webbing that restrains an occupant is wound; an actuator that generates instantaneous rotational drive force by gas that is generated during an emergency; a flywheel that rotates by the rotational drive force of the actuator; a speed increasing mechanism that is housed inside the flywheel and that increases the rotational speed of the actuator and transmits it to the flywheel; and a connecting and disconnecting unit that connects a low-speed rotation side of the speed increasing mechanism and the belt reel during rotation of the flywheel, wherein the belt reel rotates to the webbing winding-up direction by the rotational drive force of the actuator.

3 Claims, 5 Drawing Sheets

VEHICULAR SEAT BELT

TECHNICAL FIELD

The present invention relates to a vehicular seat belt that is provided with a function that winds a webbing for restraining an occupant during an emergency.

Priority is claimed on Japanese Patent Application No. 2008-109012, filed Apr. 18, 2008, the content of which is incorporated herein by reference.

BACKGROUND ART

A vehicular seat belt device is known in which the restraint of an occupant by a webbing is enhanced by winding up the webbing with an actuator during an emergency. This seat belt device is provided with: a gas generator that instantaneously generates a high-pressure gas upon receiving an input of an actuation signal; and an actuator that causes a belt reel to rotate upon receiving a gas pressure that is generated by the gas generator. When the gas generator generates a high-pressure gas during an emergency, the webbing is instantaneously drawn in by the actuator that has received that gas pressure.

However, in the case of this type of seat belt device, since the large drive force that is obtained by the gas generator is of an instantaneous nature, it is difficult to sustain the restraining force of the occupant by the webbing.

For this reason, to counter this a constitution has been proposed that couples a flywheel to a rotation axis of the actuator that uses gas pressure, whereby it is possible to sustain the restraining force by the inertial rotation of the flywheel after the gas pressure rapidly falls (refer to, for example, Patent Document 1).

[Patent Document 1] Japanese Unexamined Patent Application, First Publication No. 2003-25955

DISCLOSURE OF THE INVENTION

Problems to be Solved by the Invention

However, in the aforementioned conventional seat belt device, although it is possible to sustain the restraining force with the webbing by using a flywheel, in order to sustain a reliable occupant restraint by the webbing, the flywheel must be made larger, and as a result an increase in size of the device as a whole becomes a concern.

In view of the above-described circumstances, the present invention has an object of providing a vehicular seat belt device that can sufficiently sustain the occupant restraining force during an emergency without leading to an increase in size of the device as a whole.

Means for Solving the Problems

In order to solve the aforementioned issues, the present invention employs the following. In particular, a vehicular seat belt device according to an aspect of the present invention includes: a belt reel on which a webbing that restrains an occupant is wound; an actuator that generates instantaneous rotational drive force by gas that is generated during an emergency; a flywheel that rotates by the rotational drive force of the actuator; a speed increasing mechanism that is housed inside the flywheel and that increases the rotational speed of the actuator and transmits it to the flywheel; and a connecting and disconnecting unit that connects a low-speed rotation side of the speed increasing mechanism and the belt reel during rotation of the flywheel, wherein the belt reel rotates to the webbing winding-up direction by the rotational drive force of the actuator.

According to the aforementioned vehicular seat belt device, when the actuator is driven to rotate by gas that is generated during an emergency, the flywheel rotates via the speed increasing mechanism inside the flywheel. When the flywheel rotates in this way, since the connecting and disconnecting unit connects the low-speed rotation side of the speed increasing mechanism and the belt reel, the rotational force of the flywheel is transmitted to the belt reel. The flywheel continues the rotation even after the rotational force of the actuator has decreased. Also, since the rotation of the actuator is transmitted to the flywheel via the speed increasing mechanism, sufficient inertial energy is accumulated in the flywheel even if the flywheel is reduced in size and weight.

It may be arranged such that the speed increasing mechanism includes: an external tooth gear that is arranged in a hollow portion inside the flywheel and that rotates integrally with the flywheel; and an internal tooth gear that is connected to the actuator via the connecting and disconnecting unit and that is meshed with the external tooth gear in the hollow portion, and the rotating shaft of the flywheel is offset from the rotating shaft of the belt reel.

In this case, during an emergency, when the actuator is driven to rotate, the internal tooth gear rotates in the hollow portion inside the flywheel, and the external tooth gear that is meshed to the internal tooth gear rotates at an increased speed. The flywheel rotates integrally with the external tooth gear. Also, the flywheel is arranged offset with respect to the rotating shaft of the belt reel. For this reason, it is possible to provide a suitable space as necessary on the side of the belt reel at which the flywheel is provided.

It may be arranged such that when the rotational speed of the actuator has been decreased, the connecting and disconnecting unit releases the connection between the actuator and the internal tooth gear.

In this case, when the rotational speed of the actuator has been decreased, since the speed increasing mechanism is separated from the actuator, the flywheel can continue the rotation without being influenced by the reduction in speed of the actuator.

Advantageous Effects of the Invention

According to the aforementioned vehicular seat belt device, it is possible to accumulate the rotational force of the actuator due to gas pressure in the flywheel via the speed increasing mechanism. Also, it is possible to transmit the rotation of the flywheel to the belt reel via the connecting and disconnecting unit. Moreover, since the speed increasing mechanism is housed inside the flywheel, it is possible to sufficiently sustain the restraining force of the occupant during an emergency without leading to an increase in the overall size of the device.

Also, according to the aforementioned vehicular seat belt device, it is possible to obtain a compact speed increasing mechanism that has an external tooth gear and an internal tooth gear inside the flywheel. Moreover, the rotating shaft of the flywheel is arranged offset with respect to the rotating shaft of the belt reel. For this reason, it is possible to provide a suitable space as necessary on the side of the belt reel at which the flywheel is provided. As a result, the overall size of the device can be further reduced, and moreover it is possible to increase the degree of freedom of arranging components.

Moreover, according to the aforementioned vehicular seat belt device, the flywheel can continue the rotation without being influenced by the reduction in speed of the actuator. As a result, it is possible to continue the winding up of the webbing by the belt reel using the inertial energy of the flywheel even after the reduction in speed of the actuator.

Figure 1:
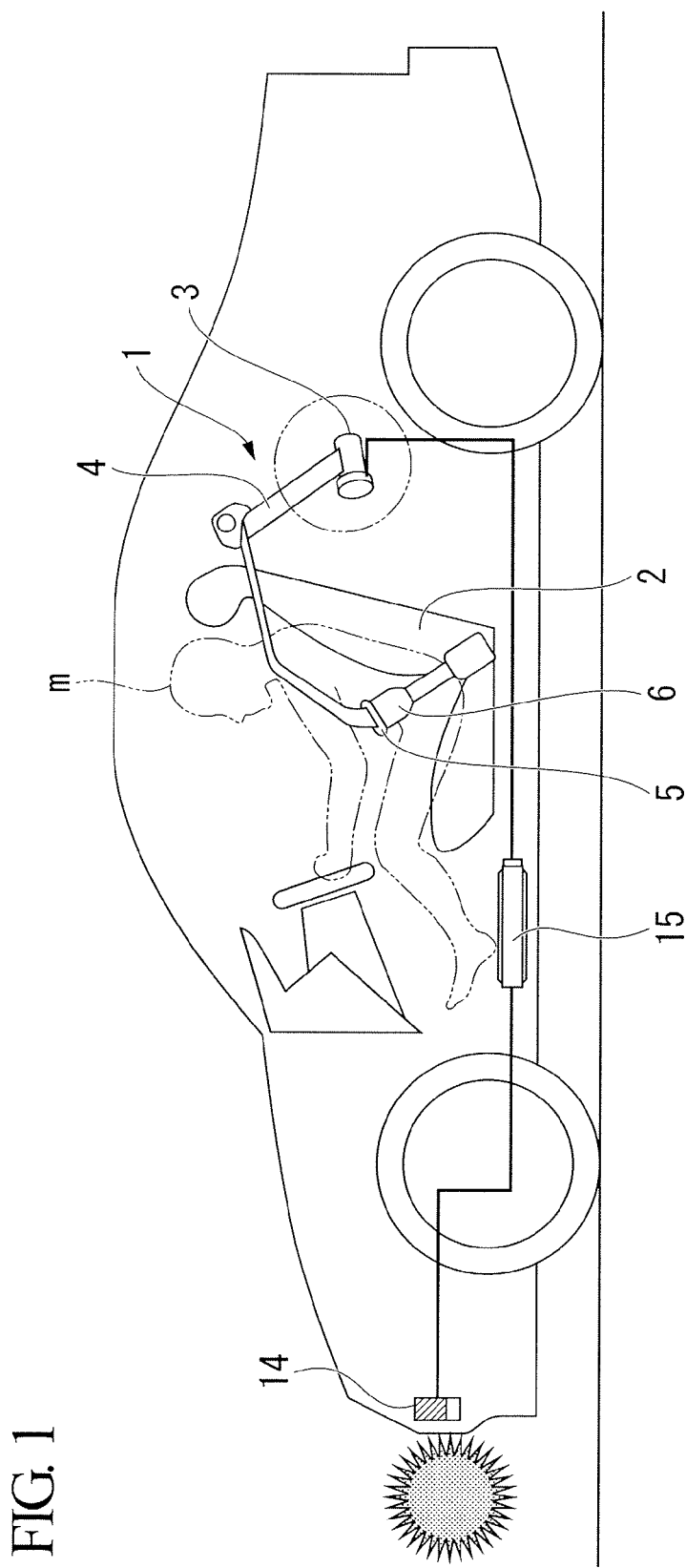
FIG. 1 is a schematic configuration view showing the seat belt device according to an embodiment of the present invention.

DESCRIPTION OF REFERENCE NUMERALS 1 seat belt device
4 webbing
11 belt reel
13 actuator
17 speed increasing mechanism
18 flywheel
19 centrifugal clutch (connecting and disconnecting unit)
27 external tooth gear
28 internal tooth gear
P1, P2 rotating shafts Best Mode for Carrying Out the Invention Hereinbelow, an embodiment of the present invention will be described with reference to the drawings.

FIG. 1 is a view that shows an schematic constitution of a seat belt device 1 according to the present invention together with a vehicle. Reference number 2 in the figure denotes a seat on which an occupant m sits. This seat belt device 1 is provided with a retractor 3 that is fixed to a center pillar that is not shown. A tongue plate 5 is attached to a webbing 4 that is drawn out from the retractor 3. This tongue plate 5 is capable of being connected to and disconnected from a buckle 6 on the vehicle body floor side. The webbing 4 is wound onto the retractor 3 in the initial state. The occupant m draws out the webbing 4 by hand, and fixes the tongue plate 5 into the buckle 6, whereby mainly the chest and abdomen of the occupant m are restrained with respect to the seat 2.

Figure 2:
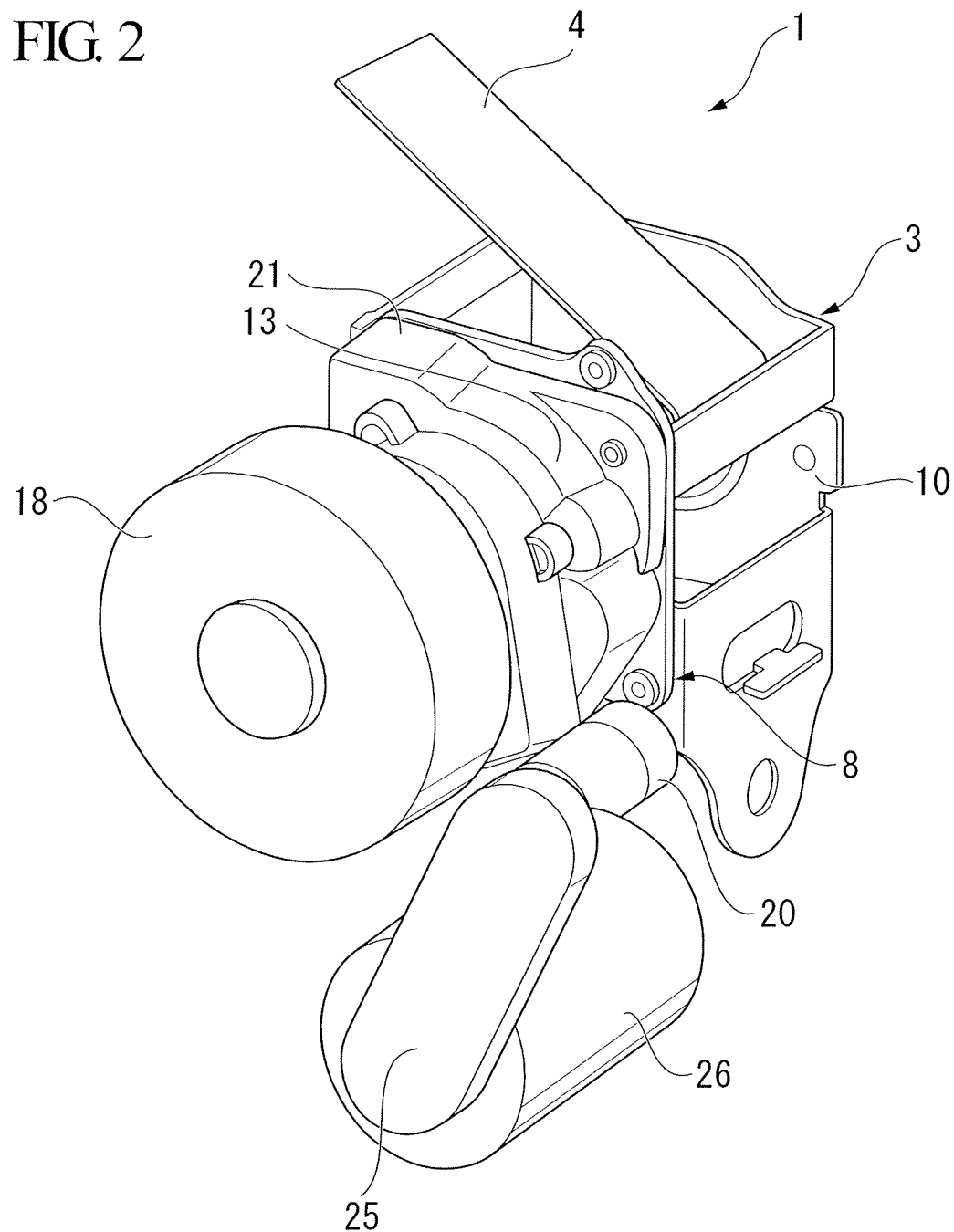
FIG. 2 is a perspective view showing the retractor portion of the seat belt device according to the embodiment.
Figure 3:
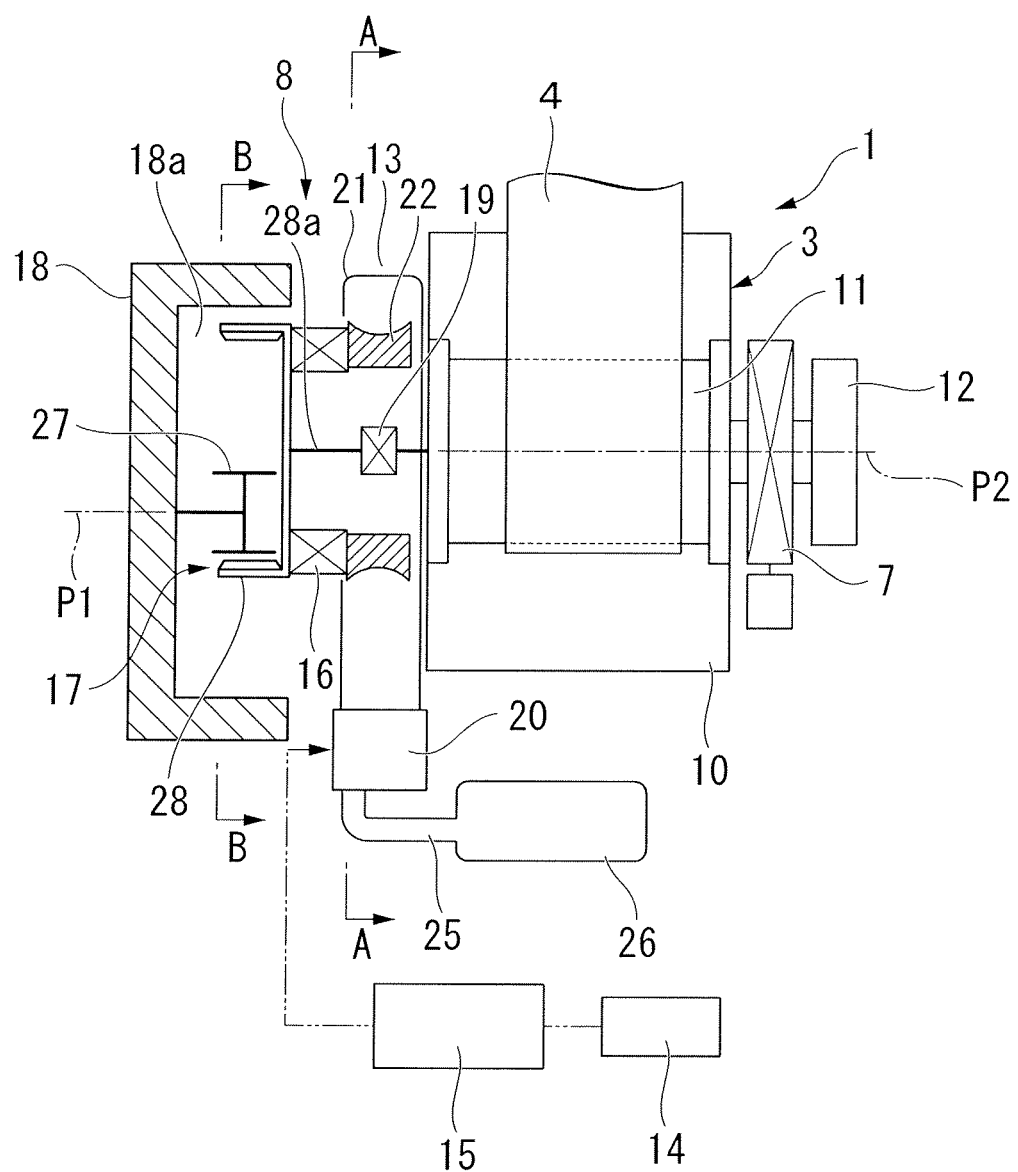
FIG. 3 is a schematic longitudinal sectional view showing the seat belt device according to the embodiment, which centers on the retractor portion.

FIG. 2 is a perspective view that shows the retractor 3 of the seat belt device 1, and FIG. 3 is a schematic longitudinal sectional view of the seat belt device 1 centered on the retractor 3.

A lock mechanism 7 that regulates the rapid drawing out of the webbing 4 and a pretensioner 8 that performs winding up of the webbing 4 during an emergency are provided in the retractor 3 that performs drawing out and winding up of the webbing 4.

A belt reel 11 on which the webbing 4 is wound is rotatably supported by a retractor frame 10 of the retractor 3. The aforementioned lock mechanism 7 and a wind-up spring 12 that biases the belt reel 11 in the webbing wind-up direction are arranged on one end side of the belt reel 11 in the axial direction thereof. Also, the main constitution of the pretensioner 8 is arranged on the other end side of the belt reel 11 in the axial direction thereof.

The pretensioner 8 is provided with an actuator 13 that generates rotational force that has gas pressure as its drive source, an emergency state detector 14 such as a millimeter-wave radar, a controller 15 that outputs an actuation command to the actuator 13 upon receiving a detection signal from the emergency state detector 14, a speed increasing mechanism 17 that is connected to the actuator 13 via a one-way clutch 16, a flywheel 18 that is connected to the high-speed rotation side of the speed increasing mechanism 17, and a centrifugal clutch 19 that performs switching between the connected state and disconnected state between the low-speed rotation side of the speed increasing mechanism 17 and the belt reel 11.

Figure 4:
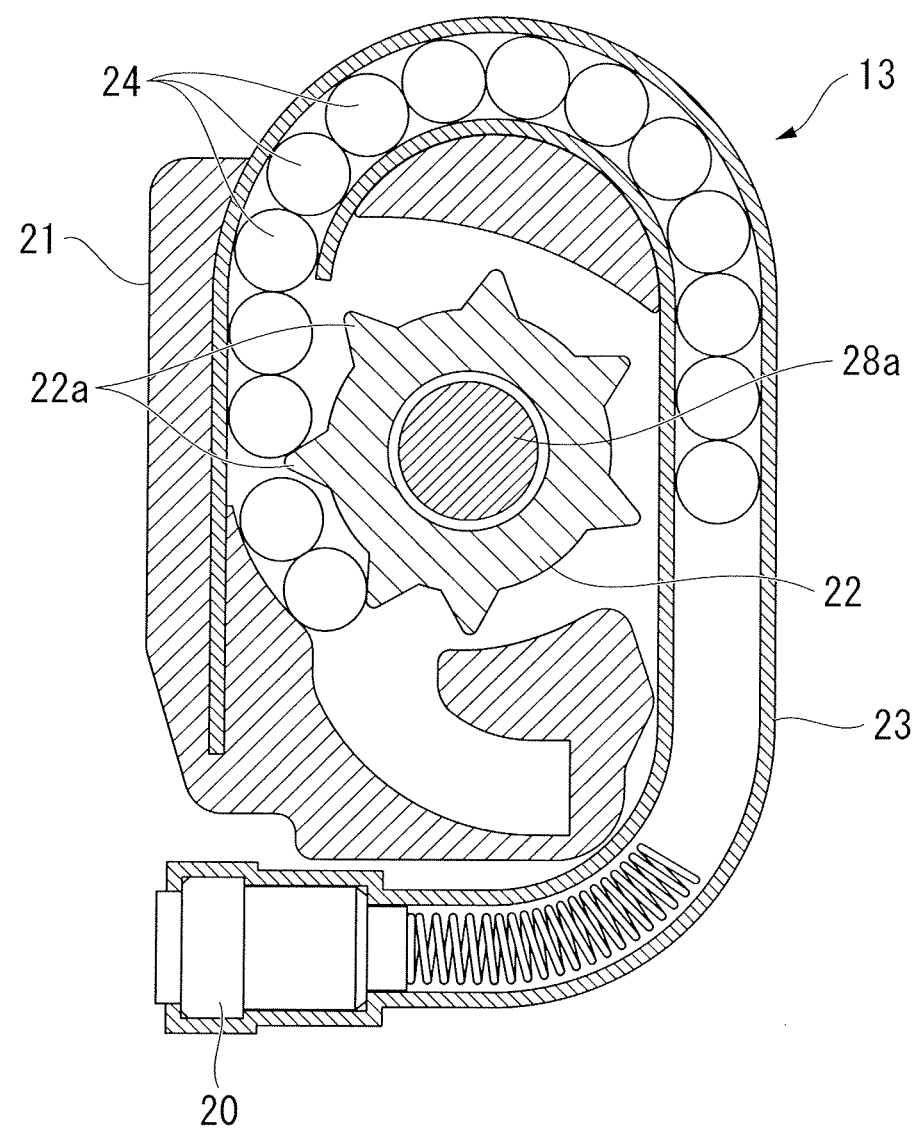
FIG. 4 is a cross-sectional view taken along the line A-A of FIG. 3.

FIG. 4 shows a cross-section of the actuator 13 of the pretensioner 8.

As shown in the figure, the actuator 13 is provided with a gas generator 20 that instantly generates a reaction gas upon receiving an actuation command from the controller 15, a rotor 22 that is rotatably provided in a housing 21 and has a plurality of blades 22a on the periphery thereof, an induction pipe 23 that forms a guide passage that curves from the gas generator 20 to the blade portions 22a of the rotor 22, and a plurality of steel balls 24 that are filled in the guide pipe 23. In this actuator 13, the plurality of steel balls 24 in the induction pipe 23 are continuously punched out toward the blades 22a of the rotor 22 upon receiving the gas pressure of the reaction gas that is generated by the gas generator 20. Each steel ball 24 that is punched out causes the rotor 22 to rotate in a continuous manner.

Also, in the case of the present embodiment, as shown in FIG. 2 and FIG. 3, an accumulator 26 is connected to the gas generator 20 via a branch pipe 25. An extension of the duration time of the gas pressure supply is attempted by an accumulation function of the accumulator 26.

The flywheel 18 has a hollow structure with a bottom ended cylindrical shape of which one end side in the axial direction is open. The flywheel 18 is arranged adjacent to the actuator 13 so that the opening of the one end side faces the actuator 13 side. The flywheel 18 is rotatably supported via axle bearings, that is not shown in the figures, in the housing 21 of the actuator 13.

Figure 5:
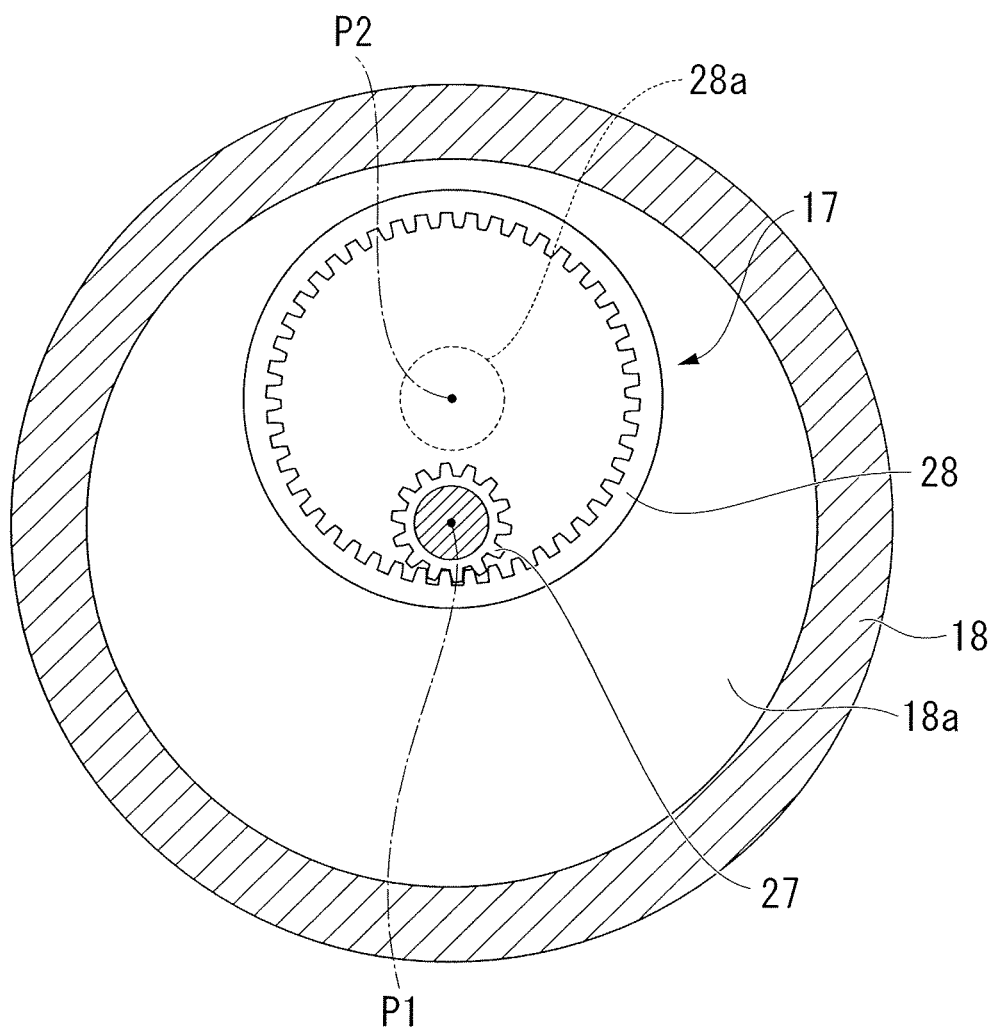
FIG. 5 is a cross-sectional view taken along the line B-B of FIG. 3.

FIG. 5 is a cross-sectional view of the flywheel 18 and the speed increasing mechanism 17.

As shown in this FIG. 5 and FIG. 2, an external tooth gear 27 with a small diameter and a rotating shaft (rotating shaft P1) of the flywheel 18 are integrally provided in a hollow portion 18a of the flywheel 18. An internal tooth gear 28 with a bottom ended cylindrical shape that is housed in the hollow portion 18a of the flywheel 18 is meshed with the tooth surface of the external tooth gear 27. The external tooth gear 27 and the internal tooth gear 28 constitute the speed increasing mechanism 17. The rotational speed of the internal tooth gear 28 is increased by a ratio corresponding to the gear ratio of the external tooth gear 27 and the internal tooth gear 28, and transmitted to the external tooth gear 27 (flywheel 18).

The internal tooth gear 28 is connected to the rotor 22 of the actuator 13 via the one-way clutch 16. The one-way clutch 16 allows the transmission of the rotational force in the webbing winding-up direction from the actuator 13 (rotor 22) to the speed increasing mechanism 17 (internal tooth gear 28), but blocks the transmission of the power from the speed increasing mechanism 17 (internal tooth gear 28) to the actuator 13 (rotor 22).

Also, a connecting shaft 28a is integrally provided in the internal tooth gear 28. This connecting shaft 28a is capable of being connected to and disconnected from the belt reel 11 via the centrifugal clutch 19. The centrifugal clutch 19 maintains the disconnected state of the internal tooth gear 28 and the belt reel 11 while the rotation of the connecting shaft 28a is stopped. On the other hand, when the connecting shaft 28a rotates in accordance with the rotation of the flywheel 18, the centrifugal clutch 19 puts the internal tooth gear 28 and the belt reel 11 in a connected state by the centrifugal force at that time.

The connecting shaft 28a of the internal tooth gear 28 is arranged on the same axis as the rotating shaft P2 of the belt reel 11. The internal tooth gear 28 is meshed with the external tooth gear 27 in the hollow portion 18a of the flywheel 18. Accordingly, the rotating shaft P1 of the flywheel 18 is arranged offset from the rotating shaft P2 of the belt wheel 11 in the radial direction.

In the above constitution, when the emergency state detector 14 detects an emergency state during travel of the vehicle, an actuation signal is output from the controller 15 to the gas generator 20 of the actuator 13. The gas generator 20, upon receiving that actuation signal, instantly generates high pressure reaction gas, and the plurality of steel balls 24 that receive that gas pressure instantaneously cause the rotor 22 to rotate. The rotation of this rotor 22 is transmitted to the internal tooth gear 28 of the speed increasing mechanism 17 via the one-way clutch 16. The rotation of the internal tooth gear 28 at this time actuates the centrifugal clutch 19 to cause the belt reel 11 to rotate in the webbing wind-up direction, and is increased in speed by the external tooth gear 27 and transmitted to the flywheel 18. In this way, the webbing 4 is wound up by the drive force of the actuator 13 that uses gas pressure, and the rotation energy of the actuator 13 is accumulated in the flywheel 18.

When the punching in of the steel balls 24 is completed immediately after this, the rotational speed of the actuator 13 decreases. When the rotational speed of the actuator 13 decreases, the actuator 13 is separated from the speed increasing mechanism 17 by the function of the one-way clutch 16. By this separation, the flywheel 18 continues the rotation without being influenced by the actuator 13. Thereby, even after rotational speed of the actuator 13 has decreased, the drawing in of the webbing 4 by the belt reel 11 is continued using the inertial energy of the flywheel 18.

For this reason, in the event of a collision of the vehicle occurring immediately after detection of an emergency state by the emergency state detector 14, while an occupant is being moved forward by that collision, winding up of the webbing 4 by the actuator 13 and the flywheel 18 is continued. Accordingly, in this seat belt device 1, it is possible to efficiently absorb the inertial energy of the occupant at the time of a collision.

Moreover, in this seat belt device 1, since the rotational speed of the actuator 13 is increased by the speed increasing mechanism 17, which transmits the rotation power to the flywheel 18, a reduction in size and weight saving of the flywheel 18 can be achieved. Moreover, since the speed increasing mechanism 17 is arranged in the hollow portion 18a inside the flywheel 18 in this seat belt device 1, a reduction in size of the device as a whole can be achieved.

Also, in particular, in the seat belt device 1 of the present embodiment, the speed increasing mechanism 17 is constituted by the external tooth gear 27 that is provided on the same axis as the flywheel 18 and the internal tooth gear 28 that meshes with the external tooth gear 27 within the hollow portion 18a. This allows the speed increasing mechanism 17 to be a compact and simple structure. Moreover, the rotating shaft P1 of the flywheel 18 is disposed so as to be offset in the radial direction with respect to the rotating shaft P2 of the belt reel 11. For this reason, a suitable space can be provided as necessary on the side of the retractor 3 at which the flywheel 18 is provided. That is, the degree of freedom of arranging components is improved, and as a result, there is a further advantage when making the device as a whole compact.

Note that the present invention is not limited to the above-described embodiment, and various design modifications are possible within the scope that does not depart from the spirit thereof.

INDUSTRIAL APPLICABILITY

According to the present invention, it is possible to provide a vehicular seat belt device that can sufficiently sustain the occupant restraining force during an emergency without leading to an increase in size of the device as a whole.

The invention claimed is:

1. A vehicular seat belt device comprising:
   a belt reel on which a webbing that restrains an occupant is wound;
   an actuator that generates instantaneous rotational drive force by gas that is generated during an emergency;
   a flywheel that rotates by the rotational drive force of the actuator;
   a speed increasing mechanism that is housed inside the flywheel and receives a rotational output of the actuator at one speed and transmits it to the flywheel at another speed greater than the one speed; and
   a connecting and disconnecting unit that connects a low-speed rotation side of the speed increasing mechanism and the belt reel during rotation of the flywheel, wherein
   the belt reel rotates to the webbing winding-up direction by the rotational drive force of the actuator; and
   wherein the flywheel accumulates rotational energy of the actuator and drives the belt reel with the accumulated rotational energy.

2. The vehicular seat belt device according to claim 1, wherein
   the speed increasing mechanism comprises: an external tooth gear that is arranged in a hollow portion inside the flywheel and that rotates integrally with the flywheel; and an internal tooth gear that is connected to the actuator via the connecting and disconnecting unit and that is meshed with the external tooth gear in the hollow portion, and
   the rotating shaft of the flywheel is offset from the rotating shaft of the belt reel.

3. The vehicular seat belt device according to claim 2, wherein
   when the rotational speed of the actuator has been decreased, the connecting and disconnecting unit releases the connection between the actuator and the internal tooth gear.

* * * * *